Figure 1:
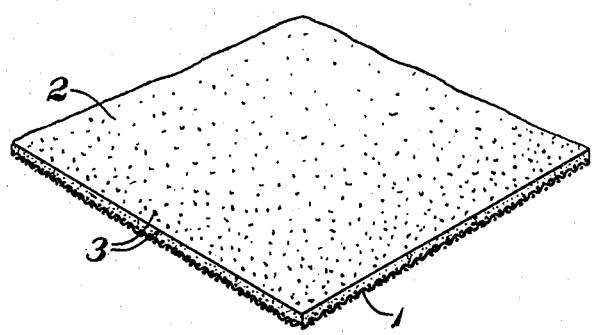

March 11, 1958 — D. V. SARBACH — 2,826,509
METHOD OF MAKING MOISTURE VAPOR PERMEABLE AND
WATER RESISTANT RUBBERY MATERIALS
Filed Aug. 4, 1954

INVENTOR.
DONALD V. SARBACH
BY
ATTY.

United States Patent Office 2,826,509
Patented Mar. 11, 1958

2,826,509

METHOD OF MAKING MOISTURE VAPOR PERMEABLE AND WATER RESISTANT RUBBERY MATERIALS

Donald V. Sarbach, Cuyahoga Falls, Ohio, assignor to The B. F. Goodrich Company, New York, N. Y., a corporation of New York Application August 4, 1954, Serial No. 447,894

9 Claims. (Cl. 117—10)

The present invention relates to a method of making a relatively thin, flexible, scuff-resistant, moisture vapor permeable and water-resistant article of manufacture comprising a vulcanized rubber. More specifically, this invention relates to a method of making a porous web or substrate containing an adherent, flexible and scuff-resistant coating of a vulcanized rubber composition which is moisture vapor permeable and water-resistant.

Rubber has been used for a long time as a coating on fabrics, such as in raincoats, to provide a water-impermeable or water-resistant layer. However, such raincoats become uncomfortable after a short period of time due to the fact that they do not breathe so that the wearer becomes hot and sweaty. While some air enters at the bottom of the coat, at the sleeve ends and about the neck, it is insufficient to provide the required amount of moisture vapor transfer. Moreover, while some mechanical improvements have been incorporated into such garments as by providing an open area in the armpits, etc., these devices are unable to cope with the problem. To perforate the rubber coating with a finely pointed instrument such as a needle will not solve the problem since once the needle is removed, the rubber which is elastic tends to close the holes. To punch out tiny areas is also impracticable since the size of the hole obtained even with the smallest punches available results in pores which are so large that water itself readily passes through the coating even though moisture vapor permeability is improved. Moreover, such mechanical methods tend to damage the underlying fabric support. Furthermore, another disadvantage with the prior art materials is that the garments made from such materials are heavy and cumbersome. A similar problem exists with shoes. A successful method for obtaining a rubber-coated fabric for shoes which is moisture vapor permeable and water-resistant is not available. Moreover, there are many places where a rubber article which is flexible, scuff-resistant, moisture vapor permeable and water-resistant can be used as a covering materials but methods to achieve the same are unknown. Accordingly, it is a primary object of the present invention to provide a method for obtaining a thin, film or sheet-like, vulcanized rubber article which is flexible, scuff-resistant, moisture vapor permeable and water-resistant.

Another object of this invention is to provide a method for obtaining a laminate comprising a substrate of a porous web or of a fabric support containing a vulcanized rubber coating which is flexible, scuff-resistant, moisture vapor permeable and water-resistant.

These and other objects and advantages of the present invention will become more apparent to those skilled in the art from the following detailed description, example and accompanying drawing.

Figure 2:
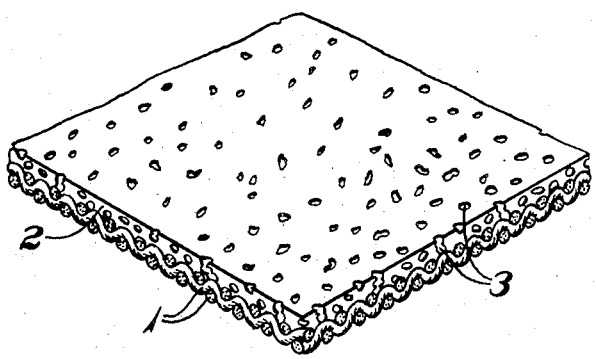

It has now been found according to the present invention that by incorporating a minor amount of a finely-divided or powdered non-hygroscopic material into a rubbery composition, depositing said composition as a layer, vulcanizing said layer and then treating it with a solvent which is a solvent for said material and is a non-solvent for said rubber to remove said material therefrom, there is readily obtained a flexible, scuff-resistant, moisture vapor permeable and water-resistant vulcanized rubber. It can be deposited by a number of methods depending on the type of laminate to be obtained. Preferably, the composition is deposited on a porous substrate to afford strength and to enable the material to be used on sewing machines as shown in the accompanying drawing in which Figure 1 is a perspective view of an article which may be produced by a method of the present invention and Figure 2 is an enlarged fragmentary perspective view of the article shown in Figure 1. In the drawing, in which the same numerals represent the same parts of both figures, porous fabric base 1 contains adhered thereto moisture vapor permeable, water resistant coating 2 of the present invention. Microscopic pores 3—3 disposed in coating 2 permit the laminate to breathe without readily permitting the transmission of water. By means of the present invention light weight laminates can be obtained which can be fabricated into garments which offer no discomfort to the wearer over extended periods of time. The articles produced by the method of the present invention will find many uses as coverings, in raincoats and shoes, and the like.

The rubber or rubbery material used in the composition of the present invention may be any vulcanizable naturally occurring crude rubber such as caoutchouc which is essentially a rubbery polymer of isoprene, and the like, or such synthetic rubbers as the rubbery polymers of the open-chain conjugated dienes having from 4 to 8 carbon atoms such as the butadiene-1,3 hydrocarbons which include butadiene-1,3; isoprene; 2,3-dimethyl butadiene-1,3; 1,4-dimethyl butadiene-1,3; piperylene; and the like; chlorobutadiene-1,3; and mixtures thereof; or the copolymers of these and similar materials with each other or with such copolymerizable monomeric materials as isobutylene, styrene, methyl styrene, metachlorostyrene, acrylonitrile, methacrylonitrile, alpha chloro acrylonitrile, methyl acrylate, ethyl acrylate, butyl acrylate, methyl methacrylate, ethyl methacrylate, 2-vinyl pyridine, and similar materials and mixtures thereof such as polymers obtained by interpolymerizing 3, 4, or more monomers, for example, interpolymerized butadiene-1,3, styrene and acrylonitrile. Mixtures of the natural and synthetic rubber homo-, co-, and interpolymers may also be used. While "butyl" rubber contains a major amount, about 98% by weight, of the olefin (97½% isobutylene) and the balance the diene (isoprene), the conjugated diene generally amounts to at least 50% by weight in the synthetic rubbery copolymers and preferably amounts to from about 55 to 85% by weight the balance being the other co- or interpolymerizable olefinic monomer(s). Rubbery organic polysulfide polymers such as the "Thiokol" rubbers as well as the rubbery polyacrylates may also be used in practice of the present invention. The chlorobutadiene polymers, such as the various neoprenes, and especially the homopolymeric chlorobutadienes, are preferred where oil and heat resistance are desired. Other very desirable copolymers to use are the oil resistant nitrile rubbers, containing about 55 to 65% by weight of butadiene-1,3 and the balance acrylonitrile and the highly abrasion resistant, tough copolymers of about 55 to 85% by weight of butadiene-1,3 and the balance styrene.

The material used to form the small, microscopic pores in the rubbery composition (rubber and other compounding materials) and to provide for vapor permeability but which leaves the rubbery composition in a water-resistant condition should be non-hygroscopic and soluble in a non-solvent for the rubbery composition. Moreover, it should be insoluble or only sparingly soluble in the rubbery composition or incompatible with the rubber in order that it can readily be removed from the same. Furthermore, the pore-forming material should be a solid and not decompose, melt or soften in the rubbery composition at drying and vulcanizing temperatures. Materials thus found useful in the practice of the present invention are alkali metal halide salts such as sodium chloride, potassium chloride, sodium bromide, potassium bromide and the like and mixtures thereof which are insoluble in the rubbery composition but are readily soluble in a solvent such as water which is a non-solvent for the components of the rubbery composition. Other materials exhibiting the aforementioned properties can, likewise, be used in the practice of the present invention. Additionally, the pore-forming material should be used in the rubbery composition in a finely-divided or powdered form to provide a plurality of fine pores throughout the rubbery composition after vulcanization and washing. Preferably, essentially all of the particles of the pore-forming material should pass through about a 65 mesh USS screen and a predominant amount through about a 100 mesh USS screen. While somewhat larger size particles can be employed, the particles should not be in the form of chunks or be of granulated size since the pores formed are too large and the resulting vulcanized rubbery composition will not be water-resistant or retain the desired static head of water, that is, about 15 to 35 in. $H_2O$ (Suter hydrostatic pressure). Moreover, a rubbery composition containing large pores has an uneven, irregular and spongy surface which tends to hold and pass water and which detracts from its appearance and saleability, particularly as a material for garments whereas in the articles produced by the method of the present invention the surface is even, regular and non-spongy. Furthermore, rubbery compositions and laminates thereof prepared according to the present invention resist dirt and dust whereas rubbers with large pores readily catch and retain the same. On the other hand, the pore-forming particles should not be very substantially finer than shown above as they tend to reduce the vapor permeability of the rubber below a statisfactory level so that it is no longer considered breathable. Moreover, such very fine particles may tend to remain in the rubber and reduce its abrasion and crack resistance. The pore-forming material is used in a minor amount based on the amount of the rubber used. More particularly, the amount of the pore-forming material used will vary from about 20 to 90 parts by weight per 100 parts by weight of the rubbery component of the composition. Preferably, the amount of pore-forming material employed should vary from about 30 to 50 parts by weight per 100 parts by weight of the rubbery component of the composition to obtain the best combination of moisture vapor permeability and water-resistance. Detergents such as Sotex CW (compounds of long-chain fatty acid esters of multiple ether amine linkages), Santomerse S (salts of substituted aromatic sulfonic acids), Aerosol 18 (N-octadecyl disodium sulfosuccinamate), and the like, in amounts of from about 0.5 to 5 parts by weight per 100 parts by weight of rubber, may be added to the rubber composition to increase the wetting power of the water or other solvent and to facilitate its entry into the pores of the rubber after vulcanization to remove the pore-forming material such as salt. It can be added to the rubber in a Banbury or on a rubber mill or mixed with salt prior to incorporation of the salt into the rubber composition. It is a feature of the present invention that the pore forming material is evenly distributed throughout the dry composition, or one containing a rubber solvent, as it does not settle out to leave areas on subsequent vulcanization and washing which have widely varying moisture vapor transmission and water-resistance.

Conventional compounding materials are added to the rubber in amounts well known to the art such as antioxidants, reinforcing pigments, pigment colors, fillers, extenders, inhibitors, accelerators, deodorants, vulcanizing agents, fungicides, germicides, detergents, and the like. Examples of suitable compounding materials for incorporation into the rubbers disclosed herein are phenyl beta naphthylamine (Age Rite Powder), aldol alpha naphthylamine (Age Rite Resin), polymerized trimethyl dihydroquinoline (Age Rite Resin D), 2-mercapto benzothiazole disulfide (Altax), N-cyclohexyl-2-mercaptobenzothiazole sulfene amide (Santocure), polyaralkylated phenol (SPAR), 2-mercaptobenzothiazole (Captax), precipitated silicon dioxide (Hi-Sil), zinc salt of mercaptobenzothiazole, precipitated calcium silicate (Silene), red iron oxide, titanium dioxide, yellow iron oxide, arc silica, "Monox" or silicon monoxide, magnesium oxide, zinc oxide, clay, MPC black, EPC black, furnace black, stearic acid, coumarone indene type resins, polymerized petroleum hydrocarbons (Resinex), petroleum tetramethyl thiuram disulfide (methyl Tuads), tetraethyl thiuram disulfide (ethyl Tuads), phthalic anhydride, triethanol amine, ground wood cellulose (Solka-Flock), sulfur, trimethyl trimethylene triamine, triethylene tetramine, light process oil, salicylic acid, sodium acetate, dibutyl sebacate, etc. Minor amounts of resins which are compatible with the rubbery material and do not adversely affect its curing properties such as plasticized polyvinyl chloride, copolymerized vinyl chloride-vinylidene chloride, high styrene-butadiene resins, and the like also may be blended into the rubbery composition to somewhat harden the same if such is desired. However, it is to be understood that the fillers, curing agent, etc., are employed in an amount necessary to give a flexible, elastomeric rubber product and not a hard, rigid rubber.

Volatile organic solvents for the rubber material of the composition such as benzene, toluene, xylene and the like are employed in making liquid to putty-like compositions for spread coating, roller coating, etc. The solvents are used in amounts necessary to provide the desired consistency. In general, for spread coating the amount of solvent may vary from about 130 to 180 parts by weight of solvent for every 100 parts by weight of the dry rubber composition including the pore-forming material and compounding materials. However, the amount of solvent used may vary widely depending on the method of coating and can be from about 75 to 300 parts by weight of solvent per 100 parts by weight of dry rubber composition. It will be appreciated that where flexible laminates are desired, the penetration of the base should be kept to a minimum to avoid stiffening of the fabric. This may be obtained by reducing the amount of solvent or pre-coating the fabric base.

The supporting material to which the rubbery composition of the present invention is applied and which is highly desirable to provide increased strength and sewability to the thin coating is preferably of the open-weave type which is capable of elongation, such as netting, although other weaves such as drill, twill and the like which are breathable or porous may be used. While sized fabric can be used, it is preferable to employ unsized fabric. The cloth itself may be of cotton, wool, or other natural material, paper, or synthetic material, or mixtures thereof, which are capable of withstanding the vulcanizing temperature of the rubbery components of the composition without losing their shape, strength or the like. They can be woven, knitted, felted, etc. The support or base material should also not dissolve in the solvent for the rubbery material nor in the solvent for the pore-forming material. It is apparent that the rubbery composition containing the pore-forming element disclosed herein can be calendered, spread coated and the like as a temporary thin layer onto a metal base such as a continuous stainless steel belt, aluminum foil, or other substrate to which it will not normally adhere without the use of adhesives, dried if necessary, stripped from the metal base, vulcanized, or stripped after being vulcanized, and washed to provide a flexible, abrasion or scuff-resistant, breathable and water-resistant film or sheet which subsequently can be adhered if desired by means of an adhesive if necessary to a permanent base material, porous or not, to provide additional strength including the use of vulcanization for the adhesive if necessary. However, depositing the rubbery vulcanizable pore-forming composition directly on its reinforcing base is to be desired as it eliminates many steps.

In preparing the rubbery compositions of the present invention the ingredients including the pore-forming material may be mixed together in a Banbury or on a rubber mill, the accelerator and vulcanizing agent preferably being added last on a cold mill, and where a dry mix is being used, calendered onto the support which may or may not have previously been treated with an adhesive to improve adherence between the breathable, water-resistant coating and the base.

Where a dough-like or spreadable composition is desired, the solvent may be added after compounding by mixing the various components together in a suitable mixing apparatus. The pore-forming material may also be added to the rubber composition in the solvent. The dough-like mixture is then spread coated on the base to provide a thin continuous layer, warmed or dried to remove the solvent and then cured. However, where only one layer is deposited by spread coating, the drying step to eliminate the solvent may be incorporated in the vulcanizing step. Generally during spread coating, it is necessary to apply several coats with drying steps interposed to build up the desired thickness of the layer before the complete assembly is vulcanized. This may be accomplished by running the base material under a plurality of separate spreading stations in series with heating means to evaporate the solvent interposed between each one. Alternatively, the spread coated base material may be dried and wound up with an intervening layer of a protective covering such as another layer of closely woven cloth, polyethylene, etc., interposed between the windings and then the coating process repeated, the intervening layer of protective material being unwound from the roll and separately collected as the second or other coating layer is applied. Instead of merely drying after each pass each individual layer may be vulcanized or dried and vulcanized before the succeeding layer is applied. Spread coating is particularly effective in obtaining thin, flexible and adherent coatings of a thickness of up to about 0.006 inch. It is difficult, if not impossible, to adequately obtain calendered coatings of .006 inch or less which are even, free of blisters, and which are of the same thickness generally throughout the length and width of the coating. The spread coating technique is particularly desirable where light weight material is needed such as material for light weight raincoats, etc. Thicker coatings, as produced by calendering, can also be obtained by spread coating.

Instead of spread coating or calendering the rubbery composition onto the base material, its viscosity can readily be altered as disclosed above by the addition of more or less solvent, filler, etc. to provide for roller coating, dipping, spraying, etc. Moreover, while the foregoing discussion has mentioned only the coating of one side of the base or web, it is apparent that the other side may be coated by calendering, spread coating, etc. Moreover, spread coating may be used on one side and calender coating on the other. Preferably, when coating the reverse side of the base, the side first coated to the desired thickness is dried and vulcanized before the opposite or reverse side is applied. However, the coated side may merely be dried and covered with a protective layer such as Holland cloth, polyethylene, etc., wound up, turned over, unwound and the reverse side coated. While coating both sides of the base will reduce the breathability of the cloth, this can be controlled within limits by varying the amount of pore-forming material in the rubber and the thickness of the layers. Moreover, the base materials may be different for example one may be of cotton and the other of nylon, wool or the like, coated on one side, and joined by an adhesive on their uncoated side. Such construction will be desired where certain properties in the base materials are required for a given article.

After the base materials have been coated as described herein, they are vulcanized at temperatures of from about 270 to 340° F. for varying lengths of time depending on the type of rubber employed in the composition and the thickness of the coating. The vulcanization step can be employed in an open steam mold, or under pressure depending on whether a design is to be imparted to the surface of the rubber. Vulcanization should precede washing of the coating, or should precede treatment with solvent to remove the pore-forming material, to avoid closing the pores of the rubber layer and distortion of the rubber coating.

After vulcanization, the rubber-coated base is washed in a solvent which is a non-solvent for the rubber and its other compounding ingredients and for the base to remove the pore-forming material. Where a soluble salt has been employed, the solvent can be water. Moreover, the water can contain a detergent to increase the penetrating or wetting power of the water in an amount of from about 0.01 to 0.50% by weight if a detergent has not been added to the rubber composition or mixed with the pore-forming material prior to incorporation into the rubber composition. The time of washing may vary from a few minutes to several hours or more depending on the amount of pore-forming material present in the rubber composition, the thickness of the rubber coating, degree of agitation, method of washing, etc. After washing, the porous rubber sheet or laminate may be dried in air at room temperature or heated in an oven at from 150–212° F. If desired, the washed and dried material can readily be printed or decals applied thereto without detracting from the serviceability of the coating.

The vulcanized rubber coated base material obtained according to the present invention has a thin layer of rubber, as thin as about 0.0003 inch, secured to the base material. Thicker coatings, of course, can be obtained depending on the spacings between the calender rolls, the number of layers spread coated, etc. Very thick coatings, however, are not desired as they detract from the moisture vapor transmission of the coating. However, coatings as thick as about 0.02 inch can be obtained which are still satisfactory as to moisture vapor transmission. Laminates prepared according to the present invention are flexible, water-resistant and moisture vapor permeable. They do not readily trap dirt and can be cleaned easily. Moreover, the rubbery composition coating is highly scuff-resistant. The moisture vapor transmission of the laminate, provided by the large number of microscopic intercommunicating pores which are evenly distributed, can vary from about 50 to 200 grams of water per 100 square inches of surface area per 24 hours and the resistance to hydrostatic pressure (Suter) can vary from about 15 to 35 inches of water. The breathable, water-resistant coated fabrics of the present invention will find utility in the manufacture of raincoats, shoes, etc.

The following example will serve to illustrate the invention with more particularity to those skilled in the art:

*Example*

The following components were homogeneously blended together in a Banbury mixer:

| Component: | Parts by weight |
|---|---|
| Chlorobutadiene-1,3 (du Pont GN-A, M2 grade) | 90 |
| Chlorobutadiene-1,3 (du Pont S, masticated for 15 min.) | 10 |
| Magnesium oxide | 4 |
| Titanium dioxide | 2 |
| Zinc oxide | 7½ |
| Carbon black FT | 20 |
| Precipitated calcium silicate | 40 |

| Component: | Parts by weight |
|---|---|
| Powdered sodium chloride | 90 |
| Dibutyl sebacate | 6½ |
| Light amber petrolatum | 2 |

The screen analysis of the sodium chloride was as follows:

1% retained #65 mesh U. S. S. Screen
1% retained #80 mesh U. S. S. Screen
14% retained #100 mesh U. S. S. Screen
84% through #100 mesh U. S. S. Screen The above composition in the amount of 275 pounds was then mixed with 65 gallons of toluene in a churn to provide a dough-like composition which was spread on cotton sateen cloth (8½ oz. sq. yd.) at the rate of 10 yards per minute to provide a coating of 0.25 oz. per square yard. The spread fabric was dried at about 170° F. by passing over steam heated coils and wound up on a roll with a layer of a protective material interposed between the convolutions of the windings. The process was then repeated ten times by unwinding the roll, winding up and reusing the protective layer until a coating about .0025 to .0030 inch thick was built up on the fabric. Starch was dusted on the surface of the fabric in the final pass and it was cured in an open steam mold on itself at 2½ hours rise, 1½ hours hold, at 290° F. The vulcanized laminate was then washed in hot water to remove the salt. It exhibited a moisture vapor transmission of 120 grams $H_2O$/100 sq. in./24 hours and a Suter hydrostatic head of 17" $H_2O$. It was highly scuff-resistant and flexible.

In summary, the present invention teaches that a breathable, water-resistant, abrasion resistant and flexible article of manufacture highly useful as a raincoat material and the like can be obtained by incorporating in a rubber composition a minor amount of a powdered, non-hygroscopic material which is soluble in a non-solvent for the rubber composition, vulcanizing and washing the vulcanizate in a solvent which is a non-solvent for the rubber composition. Alternatively the rubber composition may contain a solvent for the rubber to enable it to be spread, cast, etc. The thin, flexible sheets, films or layers of the present invention are preferably formed in combination with a reinforcing base material to provide additional strength and support. The product resulting from the practice of the present invention has a pleasing, soft surface. Microscopic examination reveals it contains a large number of evenly distributed intercommunicating pores which permit transmission of moisture vapor but effectively retard penetration or passage of fluids such as water. While the product of the method of the present invention will find great utility in raincoats, shoes, etc., it is apparent that its vapor transmission characteristics coupled with water resistance will lend itself well to the manufacture of other important products.

What is claimed is:

1. In the method for making a porous sheet material comprising depositing on a base a relatively thin layer of a non-aqueous vulcanizable rubber composition containing rubber selected from the group consisting of natural rubber, a rubbery homopolymer of a diene, a rubbery copolymer of at least one diene and at least one copolymerizable monomer having a single carbon to carbon double bond and selected from the group consisting of isobutylene, styrene, methyl styrene, metachlorostyrene, acrylonitrile, methacrylonitrile, alpha chloroacrylonitrile, methyl acrylate, ethyl acrylate, butyl acrylate, methyl methacrylate, ethyl methacrylate and 2-vinyl pyridine, a rubbery organic polysulfide polymer and a rubbery polyacrylate and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and mixed therewith a finely-divided, solid, non-hygroscopic material soluble in a non-solvent for said rubber composition, vulcanizing said layer, and removing said finely-divided material from said layer by treating said layer with a solvent which is a solvent for said finely-divided material and which is a non-solvent for said rubbery composition, the improvement in which said finely-divided material is present in said composition in an amount of from about 20 to 90 parts by weight per 100 parts by weight of said rubber in said composition and in which said finely-divided material has a particle size wherein essentially all of the particles of said material pass through about a 65 mesh USS Screen and a predominant amount of said particles pass through about a 100 mesh USS Screen to produce pores in said composition which permit vapor permeability and resist the passage of water.

2. In the method for making a porous laminated sheet material comprising a depositing in adhering relationship on a porous web a relatively thin layer of a non-aqueous vulcanizable rubber composition containing rubber selected from the group consisting of natural rubber, a rubbery homopolymer of a diene, a rubbery copolymer of at least one diene and at least one copolymerizable monomer having a single carbon to carbon double bond selected from the group consisting of isobutylene, styrene, methyl styrene, metachlorostyrene, acrylonitrile, methacrylonitrile, alpha chloroacrylonitrile, methyl acrylate, ethyl acrylate, butyl acrylate, methyl methacrylate, ethyl methacrylate and 2-vinyl pyridine, a rubbery organic polysulfide polymer and a rubbery polyacrylate and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, and mixed therewith a finely-divided, solid, non-hygroscopic material soluble in a non-solvent for said rubber composition, vulcanizing said layer in combination with said web, and treating said layer vulcanized to said web with a solvent which is a non-solvent for said rubber composition and for said web and which is a solvent for said finely-divided material to remove the same, the improvement in which said finely-divided material is present in said composition in an amount of from about 20 to 90 parts by weight per 100 parts by weight of said rubber in said composition and in which said finely-divided material has a particle size wherein essentially all of the particles of said material pass through about a 65 mesh USS screen and a predominant amount of said particles pass through about a 100 mesh USS screen to provide a flexible, scuff-resistant, moisture vapor permeable and water-resistant layer.

3. In the method for making a porous laminated sheet material comprising depositing in adhering relationship on a porous web a thin layer of a non-aqueous vulcanizable rubber composition containing a rubber selected from the group consisting of natural rubber, a rubbery homopolymer of a diene, a rubbery copolymer of at least one diene and at least one copolymerizable monomer having a single carbon to carbon double bond and selected from the group consisting of isobutylene, styrene, methyl styrene, metachlorostyrene, acrylonitrile, methacrylonitrile, alpha chloroacrylonitrile, methyl acrylate, ethyl acrylate, butyl acrylate, methyl methacrylate, ethyl methacrylate and 2-vinyl pyridine, a rubbery organic polysulfide polymer and a rubbery polyacrylate and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and mixed therewith a powdered, water soluble, non-hygroscopic inorganic salt and a volatile organic solvent for said rubber in an amount to give a dough-like to liquid-like consistency to said rubber composition, heating said layer on said web to volatilize said solvent and dry said layer, vulcanizing said layer on said web, and washing said layer with water to remove said salt, the improvement in which said salt is present in said composition in an amount of from about 30 to 50 parts by weight per 100 parts by weight of said rubber in said composition and in which said salt has a particle size wherein essentially all the particles of said salt pass through about a 65 mesh USS screen and a predominant amount of said particles pass through about a 100 mesh USS screen to provide a flexible, scuff-resistant rubber layer containing a plurality of intercommunicating microscopic pores and exhibiting a moisture vapor transmission of from about 50 to 200 grams of water per 100 square inches of surface area per 24 hours and a resistance to hydrostatic pressure (Suter) of from about 15 to 35 inches of water.

4. In a method for making a porous laminated sheet material comprising depositing in adhering relationship on a porous fabric base a thin layer of a non-aqueous vulcanizable rubber composition containing a rubber selected from the group consisting of natural rubber, a rubbery homopolymer of a diene, a rubbery copolymer of at least one diene and at least one copolymerizable monomer having a single carbon to carbon double bond and selected from the group consisting of isobutylene, styrene, methyl styrene, metachlorostyrene, acrylonitrile, methacrylonitrile, alpha chloroacrylonitrile, methyl acrylate, ethyl acrylate, butyl acrylate, methyl methacrylate, ethyl methacrylate and 2-vinyl pyridine, a rubbery organic polysulfide polymer and a rubbery polyacrylate and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and mixed therewith a powdered, non-hygroscopic, alkali metal halide salt and a voltatile organic solvent for said rubber in an amount of from about 130 to 180 parts by weight of solvent per 100 parts by weight of said rubber composition when dry, heating said layer on said web to volatilize said solvent and dry said layer, vulcanizing the layered base and washing the same in water to remove said salt, the improvement comprising repeatedly depositing a layer of said composition on said base and drying the same a predetermined number of times to provide a rubber coating of up to about 0.006 inch thick prior to vulcanizing said layered base, in which said salt is present in said composition in an amount of from about 30 to 50 parts by weight per 100 parts by weight of said rubber in said composition and in which said salt has a particle size wherein essentially all the particles of said salt pass through about a 65 mesh USS screen and a predominant amount of the particles pass through about a 100 mesh USS screen to afford a scuff-resistant, moisture vapor permeable and water resistant rubber layer on said base.

5. In the method according to claim 4 where the rubber in said rubber composition comprises a rubbery polymer of chlorobutadiene-1,3.

6. In the method according to claim 4 where the rubber in said rubber composition comprises natural rubber.

7. In the method according to claim 4 where the rubber in said rubber composition comprises a rubbery copolymer of from about 55 to 85 parts by weight of butadiene-1,3 and the balance styrene.

8. In the method according to claim 4 where the rubber in said rubber composition comprises a rubbery copolymer of from about 55 to 65 parts by weight of butadiene-1,3 and the balance acrylonitrile.

9. In the method according to claim 4 where the rubber in said rubber composition comprises a rubbery copolymer of about 98 parts by weight of isobutylene and the balance isoprene.

References Cited in the file of this patent

UNITED STATES PATENTS

| | | |
|---|---|---|
| 2,006,687 | Riddock | July 2, 1935 |
| 2,537,631 | Greenup et al. | Jan. 9, 1951 |
| 2,663,663 | Weltman et al. | Dec. 22, 1953 |

FOREIGN PATENTS

| | | |
|---|---|---|
| 244,901 | Switzerland | July 16, 1947 |
| 418,240 | Great Britain | Oct. 22, 1934 |

UNITED STATES PATENT OFFICE
CERTIFICATE OF CORRECTION

Patent No. 2,826,509

March 11, 1958

Donald V. Sarbach

It is hereby certified that error appears in the printed specification of the above numbered patent requiring correction and that the said Letters Patent should read as corrected below.

Column 1, line 53, for "materials" read -- material --; column 3, line 40, for "statisfactory" read -- satisfactory --; column 4, line 16, for "(Resinex), petroleum" read -- (Resinex), petrolatum, --; column 9, line 36, for "voltatile" read -- volatile --.

Signed and sealed this 3rd day of February 1959.

(SEAL)
Attest:

KARL H. AXLINE

Attesting Officer

ROBERT C. WATSON
Commissioner of Patents